Aug. 19, 1941.  H. C. FRENCH  2,252,763
SCRAPER
Filed April 18, 1940  3 Sheets-Sheet 1
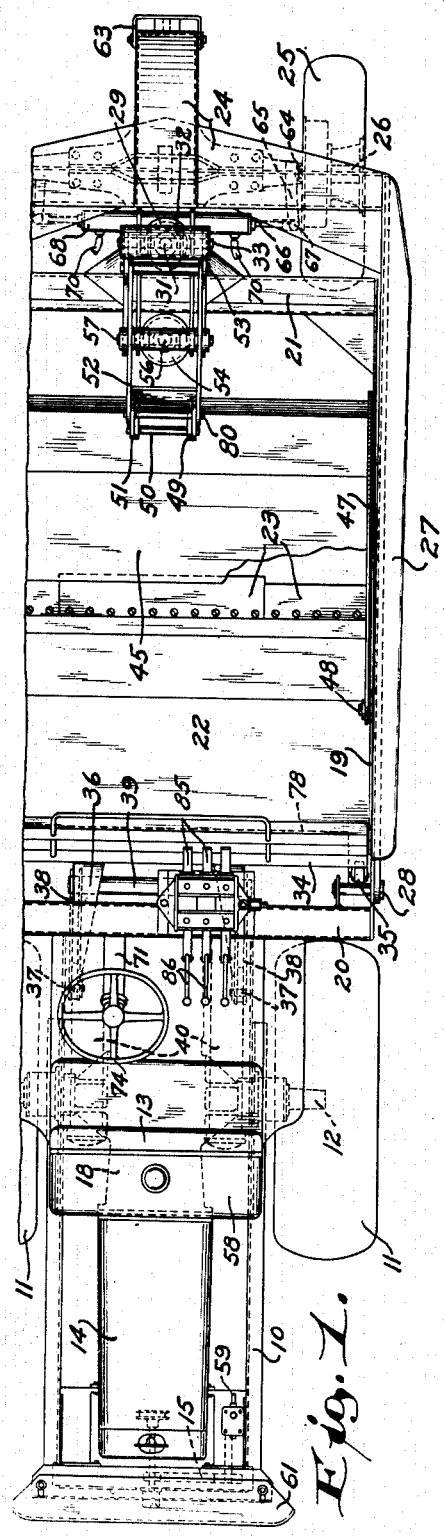
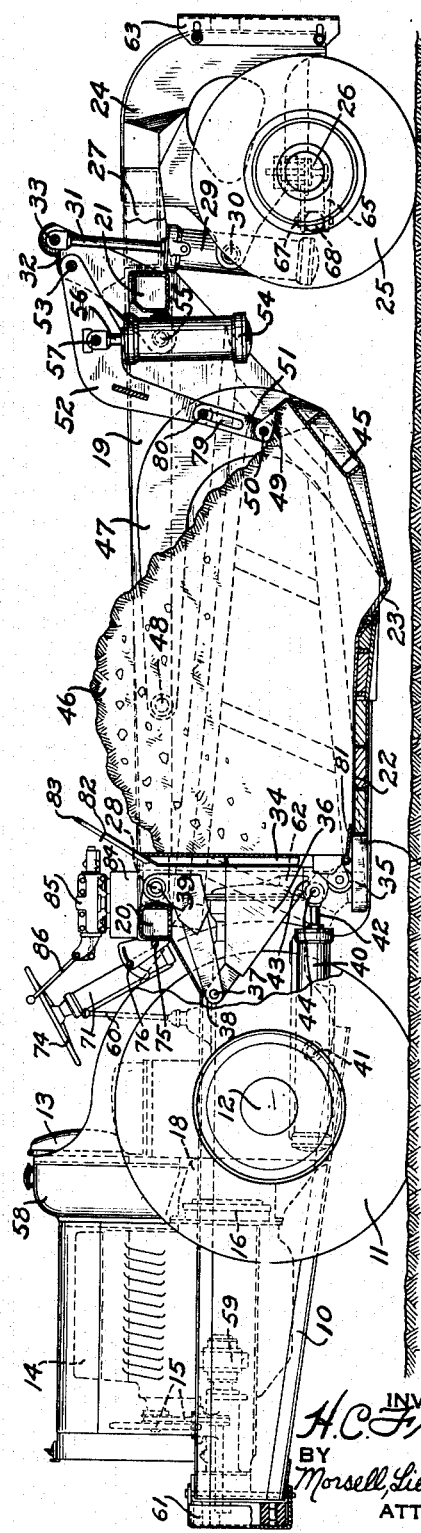
INVENTOR
H. C. French
BY
Morsell, Lieber & Morsell
ATTORNEYS.

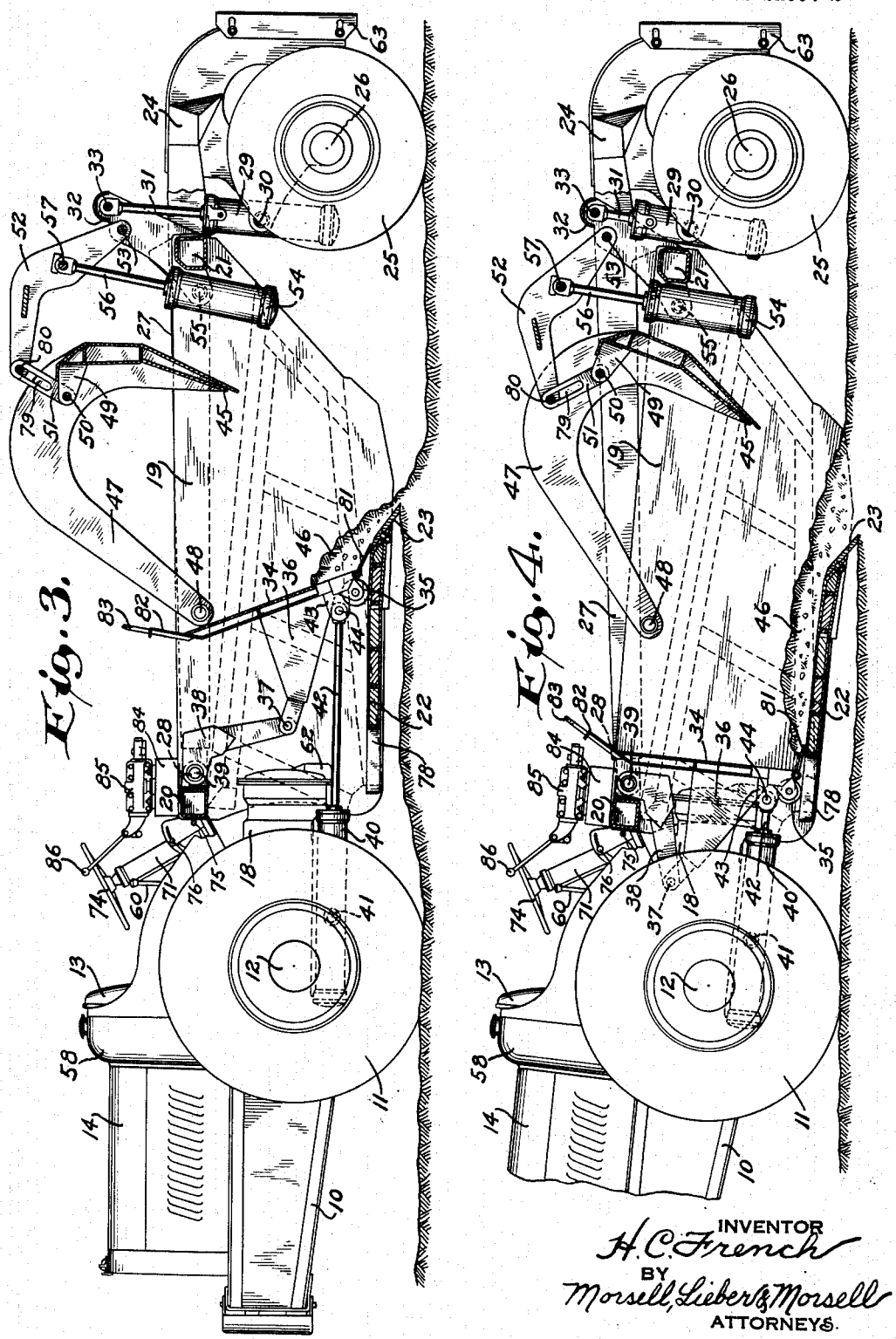

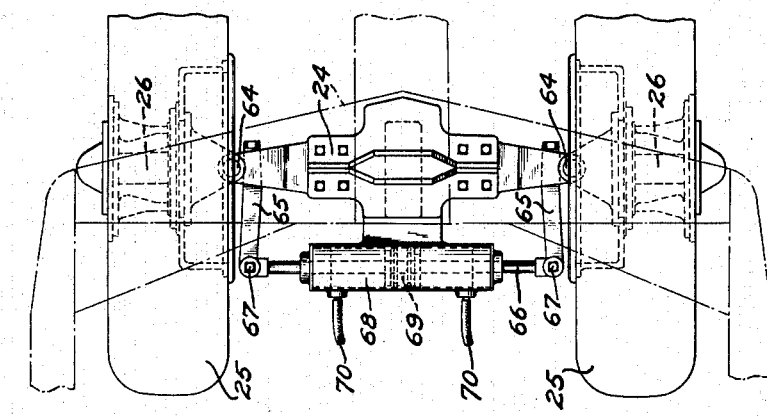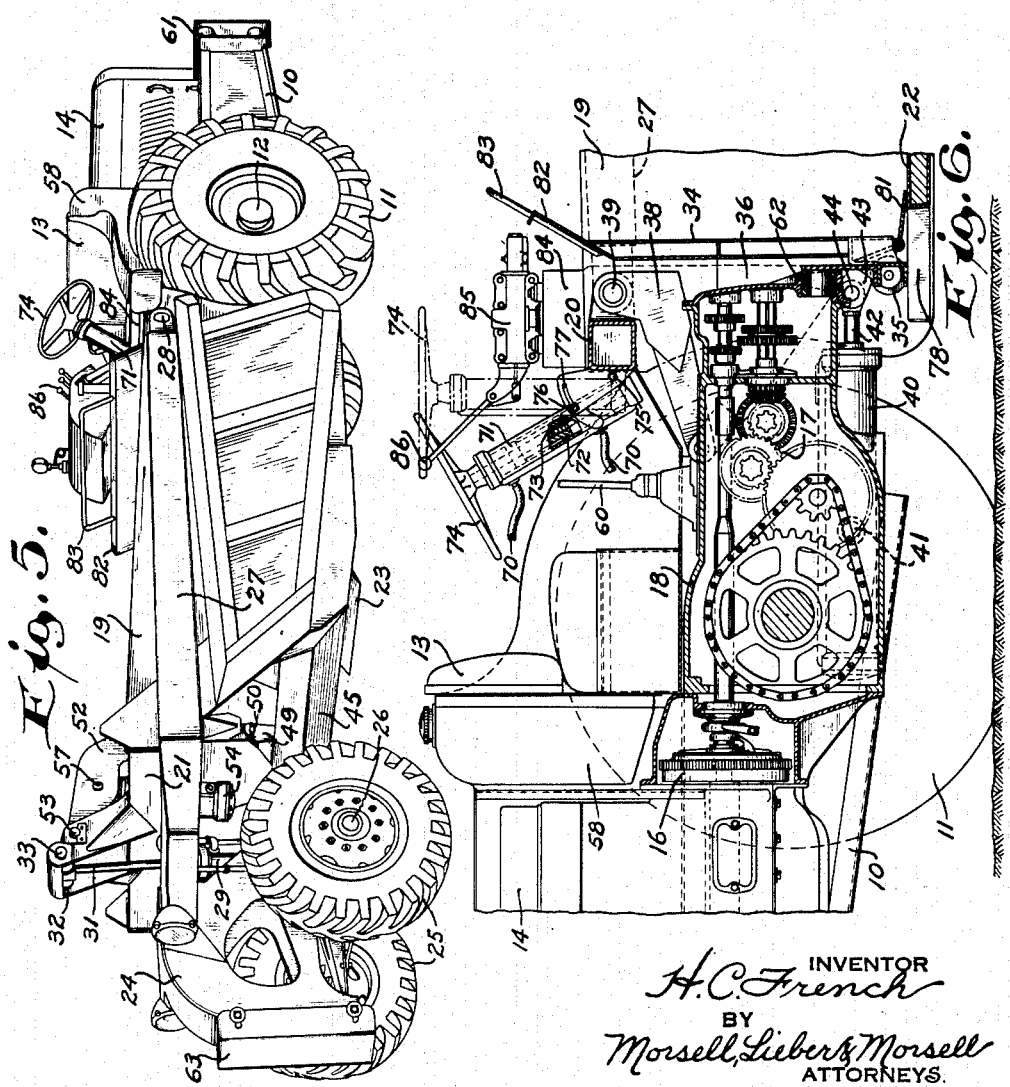

Patented Aug. 19, 1941

2,252,763

UNITED STATES PATENT OFFICE 2,252,763

SCRAPER

Henry C. French, Milwaukee, Wis., assignor to The Heil Co., Milwaukee, Wis., a corporation of Wisconsin Application April 18, 1940, Serial No. 330,255

19 Claims. (Cl. 37—126)

My invention relates in general to improvements in the art of handling material in bulk, and relates more specifically to various improvements in the construction and operation of self-powered scraper units for digging, transporting and spreading earth or the like.

Generally defined, an object of my invention is to provide an improved self-powered scraper unit which is simple, compact and durable in construction, and which is also highly flexible and efficient in operation.

It has heretofore been common commercial practice in the dirt moving and grading industry, to transport scraping assemblages along the ground by attaching an ordinary tractor thereto. While this arrangement is quite satisfactory, the procedure requires provision of independent tractor and scraper units, which when connected in tandem also makes it difficult for the tractor operator to carefully observe the operation of the trailing scraper unit. The prior duplex or trailer assemblages also necessitated transportation of the relatively heavy tractor unit in advance of the scraping and load carrying unit; and this prior arrangement furthermore required the provision of relatively complicated actuating connections between the driver's seat on the tractor and the movable mechanisms on the scraper, capable of being uncoupled when the tractor was detached from its trailer. While some attempts have heretofore been made to provide a self-powered or propelled dig and carry scraper unit, these attempts have been objectionable and relatively unsatisfactory, especially for scrapers having relatively small capacity, because of undesirable complications and relatively high cost of the assemblages.

It is therefore a more specific object of the present invention to provide an improved self-propelled dig and carry scraper assemblage which can be economically manufactured in various sizes and with various capacities, and wherein the operator can readily manipulate both the tractor and scraper controls and has a clear view of the important parts and operating conditions at all times.

Another specific object of my invention is to provide a simplified self-powered scraper unit in which the relatively movable scraper parts are hydraulically operated, and wherein the propelling mechanism and relatively heavy parts trail the scraper and load carrying bowl.

Still another specific object of this invention is to provide an extremely durable and conveniently manipulable scraping and charge carrying assemblage, which is adapted to quickly load and unload while effectively confining the material during rapid transportation thereof.

A further specific object of the invention is to provide various improvements in the construction and operation of power actuated scraper units, whereby such devices may be most economically manufactured, manipulated and operated.

These and other specific objects and advantages of my present invention will be apparent from the following detailed description.

A clear conception of the several features constituting the present improvement, and of the mode of constructing and of operating a self-powered scraper unit embodying the invention, may be had by referring to the drawings accompanying and forming a part of this specification in which like reference characters designate the same or similar parts in the various views.

Fig. 1 is a fragmentary top view of one of the improved self-propelled hydraulically actuated scraper units, showing the scraper bowl in load carrying position and with the front apron lowered;

Fig. 2 is a part sectional side elevation of the unit shown in Fig. 1, with the bowl loaded and elevated, and the front apron lowered;

Fig. 3 is a similar side elevation of the same scraper unit, with the bowl still elevated but with the front apron elevated and the rear gate moved forwardly;

Fig. 4 is another similar side elevation of the scraper unit, with the scraper blade in scraping or loading position and the front apron partially raised;

Fig. 5 is a front and side perspective view of the improved scraper unit with the bowl elevated and the front apron lowered;

Fig. 6 is a somewhat enlarged fragmentary sectional view of the power transmitting medial portion of the self-powered scraper unit; and Fig. 7 is a likewise enlarged fragmentary top view of the front steering portion of the improved unit.

While the invention has been embodied in a gasoline engine driven self-propelled dig and carry scraper unit having hydraulically actuated scraper parts, it is not my desire or intent to unnecessarily restrict the scope or utility of the improved features by virtue of such specific embodiment.

Referring to the drawings, the improved self-propelled power actuated load carrying scraper assemblage shown therein comprises in general, a main rear frame 10 transportably supported at its medial portion upon rather large driving wheels 11 by means of a driving axle 12, and having a driver's seat 13 mounted thereon above the axle 12 and between the wheels 11; a propelling motor or engine 14 mounted upon the frame 10 rearwardly of the axle 12 and seat 13, and having a power take-off 15 associated with its rear end, while the front portion of the engine 14 is drivingly connected to the axle 12 through a suitable clutch 16 and transmission gearing 17 housed within a casing 18 beneath the seat 13; a load confining bowl formed integral with the frame 10 forwardly of the axle 12 and seat 13, and having rigid opposite parallel side walls 19 firmly and permanently interconnected at their upper rear and front portions respectively, by means of transverse box-beams 20, 21, and at their lowermost rear portions by means of a fixed bottom 22 having a cutting or scraper blade 23 at the foremost edge thereof; an auxiliary front frame 24, transportably supported upon relatively small steering wheels 25 by means of swingable stub axles 26, and having a pair of laterally spaced rigid rearwardly extending side arms 27 pivotally connected at their rear ends, to the bowl side plates or walls 19, by means of alined pivot pins 28; a hydraulic hoist or jack having a cylinder 29 supported by trunnion pins 30 from the front frame 24, and also having a piston 31 movable in the cylinder 29 and connected to integral ears 32 on the front bowl beam 21 by means of a pivot pin 33; a rear end gate 34 movable supported upon the bowl bottom 22 between the walls 19 by means of rollers 35, and having rearwardly projecting integral ears 36 connected by alined pivot pins 37 with a pair of levers 38 swingably suspended from the scraper bowl by means of a suspension pin 39; a pair of hydraulic hoists or jacks each having a cylinder 40 supported by pivot trunnions 41 from the main frame 10, and a piston 42 movable in its cylinder 40 and articulably connected to the ears 43 on the rear lower portion of the end gate 34, by means of a pin 44; a front apron 45 cooperable with the cutting blade 23 to confine material 46 within the bowl and having side arms 47 swingably suspended from the bowl side walls 19 by alined pins 48, the medial portion of the apron 45 having thereon ears 49 which are connected by a pin 50 and slotted links 51 to the rear end of a lever assemblage 52 the opposite or front end of which is connected by another pin 53 to the ears 32; another hydraulic hoist or jack having a cylinder 54 swingably suspended by trunnions or pins 55 from the ears 32, and also having a piston 56 connected to the medial portion of the lever assembly 52 by means of a pin 57; a hydraulic system for supplying liquid under pressure to the jacks; and gear shift mechanisms for the tractor and jacks associated with the assemblage near the driver's seat 13.

The rear frame 10 and the load confining bowl including the side walls 19 and bottom 22, are rigidly interconnected to provide a sturdy unitary assemblage which is bodily tiltable about the rear driving axle 12 whenever the frames 10, 24 are relatively articulated about the pivot pins 28, but the bowl cannot swing or move laterally relative to the main frame 10. The motor or engine 14 is of relatively standard construction being supplied with fuel from a supply tank 58, disposed in back of the operator's seat 13, and the weight of the engine and its support approximately counterbalance the weight of the bowl and the portions of the frame 10 and transmission mechanism located forwardly of the axle 12. The power take-off 15 at the rear of the engine 14 besides being formed to drive other mechanism, also continuously drives a hydraulic pump 59 for circulating liquid through the hydraulic system; and the transmission mechanism 17 which is housed within the casing 18 is of relatively conventional construction and is controllable by means of a shift lever 60 so as to cause the motor to drive the axle 12 either forward or reverse and at selected speed. The rear end of the main frame 10 is provided with a sturdy buffer or resilient bumper 61 adapted for engagement with another tractor or implement, while the lower front portion of the transmission housing 18 is provided with another resilient bumper or abutment 62 which serves as a positive stop for limiting the rearward travel of the end gate 34, see Fig. 6.

The front frame 24 which is tiltably suspended from the steering wheels 25 by means of the swingable stub axles 26, projects forwardly beyond these wheels and is provided with a front bumper 63 adapted for engagement with another implement. The integral side arms 27 of the front frame 24, extend along and closely adjacent to the outer sides of the walls 19, so that the bowl may be raised and lowered without interference, and obstruction to the operator's view of the interior of the bowl is entirely avoided. While the front frame 24 is adapted to swing vertically with respect to the rear frame 10 about the pivot pins 28, these frames 24, 10 cannot swing or move laterally with respect to each other; and the transverse bowl beams 20, 21 serve to reenforce the side walls 19 and to maintain them properly positioned between the arms 27.

The stub axles 26 upon which the front steering wheels 25 are journalled, are swingably suspended from the front frame 24 by means of pivot pins 64, and are provided with rearwardly extending levers 65 the corresponding ends of which are secured to the opposite ends of a rod 66 by pins 67, see Fig. 7. The rod 66 extends centrally through a horizontal cylinder 68 fixedly secured to the frame 24, and a piston 69 secured to the medial portion of the rod 66 is slidable within the cylinder 68. The cylinder 68 has end ducts 70 which also communicate with the opposite ends of a cylinder 71 mounted upon the main frame 10 near the driver's seat 13, and the cylinder 71 has therein a piston 72 which is movable along the cylinder by means of a screw carried by the steering column 73 having the steering wheel 74 associated therewith. This steering assemblage is such that when the steering wheel 74 is rotated in either direction, it will move the piston 72 either up or down within the cylinder 71; and since the cylinders 68, 71 on opposite sides of the pistons 69, 72 are constantly filled with liquid, the movement of the piston 72 will cause a corresponding displacement of the piston 69 within its cylinder 68 in predetermined directions, thereby causing the wheels 25 to swing in selected directions. The piston confining and steering wheel supporting cylinder 71 is suspended from the rear transverse beam 20 of the bowl near the operator's seat 13, by means of a pivot pin 75, and carries a clamping bolt 76 which is cooperable with a slot 77 so that the steering wheel 74 may be placed in various positions of adjustment for best view of the scraper bowl, and the ducts 70 may be confined within one of the hollow arms 27. The transporting wheels 11, 25 are provided with the usual brake mechanisms which are also manipulable from the driver's seat 13, and while the smallest front steering wheels 25 advance upon and at the extreme opposite sides of the undisturbed ground, the larger rear wheels 11 travel within the cut, see Fig. 4.

The bowl bottom 22 which is rigidly secured to the lower extremities of the walls 19, has its rear central portion 78 removed so as to permit material which passes the end gate 34 to fall freely to the ground; and the scraper blade 23 which is detachably secured to the front of the bowl bottom 22, comprises a central and two similar opposite side sections, the former of which is somewhat wider than the latter and extends below the cutting edges of the narrower side sections, see Fig. 1. The front apron 45 is formed to coact with the edges of the blade 23 to close the gap between these elements when the apron is lowered as in Figs. 1 and 2; and the curved side arms 47 of the apron 45 and which coact with the pivot pins 46, are swingable closely adjacent to the inner surfaces of the side walls 19. The slots 79 in the links 51 coact with a pin 80 carried by the lever 52 in such manner that upward swinging of the pin 80 will raise the apron 45, while the slots 79 will permit this apron to be lifted independently of the lever 52 by an obstruction such as a stump or rock, which the front of the apron may encounter. The rear end gate 34 which is supported by the rollers 35 coacting with the opposite side portions of the bowl bottom 22, has a lower pivoted scraper flap 81 which constantly engages and rides along the upper surface of the bottom 22, and when the end gate 34 is against the buffer abutment 62 the gate is approximately perpendicular to the bowl bottom, whereas the angularity of the gate diminishes as it approaches the cutting blade 23, see Figs. 2 and 3. The upper part of the end gate 34 is provided with a forwardly inclined guard plate 82 for directing rising material forwardly into the bowl and thus eliminating spilling, and a hand rail 83 may also be provided for the operator.

The hydraulic system for supplying liquid such as oil under pressure to the scraper actuating jacks 29, 40, 54, comprises the pump 59, a liquid supply reservoir 84, a set of independently manipulable valves 85 operable from the driver's seat 13 by means of handles 86, and conduits leading from the valves 85 to and from the several jacks. As previously indicated, the jack 29 is adapted to raise and lower the front end of the bowl and to simultaneously raise and lower the scraping blade 23, while the horizontal jacks 40 are adapted to move the end gate 34 back and forth, and the jack 54 is adapted to adjust the front apron 45 relative to the blade 23. The frames 10, 24, side walls 19, bowl bottom 22, end gate 34, and front apron 45 are all preferably formed of relatively heavy metal plate, and it is to be noted that when the operator is stationed near the driver's seat 13 within convenient reach of all control levers, he also has an unobstructed view of the steering mechanism and of all of the working parts of the scraper assembly.

During normal operation of the improved self-propelled scraper unit, the driver or operator is stationed at the seat 13, and the motor or engine 14 is operating to propel the hydraulic pump 59. By operating the proper controls, the driver may manipulate the transmission mechanism 17 to propel the vehicle either forwardly or rearwardly, and the forward propulsion may be effected at any desired speed. The operator may then steer the vehicle by manipulating the steering wheel 74, thereby causing the front steering wheels 25 to be turned in the desired direction to effect desired steering. The operation of the steering wheel 74 will cause the piston 72 within the cylinder 71 to move either upwardly or downwardly, depending upon the direction of rotation of the wheel, and will cause the piston 69 to move within the cylinder 68, thus effecting the steering movement of the wheels 25.

Assuming the scraper to have been loaded and the bowl elevated, as in Fig. 2, the material 46 which is confined within the bowl and within the front apron 45 may be transported to any desired destination. When it becomes desirable to dump the load, the operator may manipulate the proper valves 85 with the aid of the control levers 86, to first cause the hydraulic jack 54 to elevate the apron 45, and to thereafter cause the horizontal jacks 40 to move the end gate 34 forwardly to the position shown in Fig. 3. As the end gate 34 moves forwardly, it will tilt relative to the bowl bottom 22, and the entire load of material 46 will eventually be ejected from the bowl, as clearly indicated in Fig. 3. When the load ejecting operation has been completed, the end gate 34 should be returned to the position shown in Figs. 2 and 4, by manipulation of the horizontal jacks 40, whereupon the scraper will be ready for subsequent reloading. The jack 29 may then be operated to lower the bowl and the scraper blade 23 to the position shown in Fig. 4. The depth of cut by lowering of the bowl may be gauged by the operator, and when the proper depth of cut has been determined, and the blade 23 has entered the ground, reloading of the scraper may be effected by advancing the unit forwardly. As the blade 23 passes through the ground, the lower medial portion thereof will start the cut and this starting will be followed by subsequent entry of the narrower blade sections into the ground. During such loading of the scraper the front apron 45 may be lowered more or less by manipulating the jack 54, and when sufficient loading has been effected, the apron 24 may be dropped to again coact with the blade 23, as in Fig. 2. The loaded bowl may then be elevated by again manipulating the jack 29, to place the assemblage in the position shown in Fig. 2. If during the loading operation, the front apron 45 should encounter an obstruction such as a boulder or a stump, this apron may be lifted independently of the jack 54 by virtue of the lost motion connection provided by the slots 79 and pin 80. It is also to be noted that when the rear end gate 34 is moved backwardly to its extreme position, it will encounter the abutment 62, and as this rear end gate is moved forwardly it gradually tilts so as to provide an effective discharge angle when it reaches its extreme forward position. It should also be understood that during normal use of the machine, the operator may elevate or lower the bowl to any extent by manipulating the jack 29, and he may also raise and lower the apron 45 to any desired extent by manipulating the jack 54.

From the foregoing detailed description it will be apparent that my present invention provides an extremely simple, compact and durable self-propelled scraper assemblage which is readily manipulable by a single operator located near the driver's seat 13, and in which all of the essential elements are constantly visible to the operator. By adjusting the steering wheel 74 and by utilizing the hand rail 83 on the end gate 34, the operator may assume a position wherein he can lean over the scraping bowl and thus observe all portions of the scraping and steering mechanisms. The assemblage is extremely rigid in construction by virtue of the integral formation of the bowl with the main rear frame 10, and the assemblage is furthermore simplified by utilizing the front wheels 25 for steering purposes. The bumpers 61, 63 at the opposite ends of the machine can be effectively employed for pushing purposes, and the motor 14 may also be utilized to drive other apparatus through the rear take-off 15. The entire assemblage can be built in a sturdy manner from sheet metal plate, and occupies minimum space considering the capacity of the scraper bowl. The flap 81 and guard plate 82 serve to prevent material from passing or spilling over the end gate 34, but in the event that such spillage or passage of material sould occur, the escaping material will drop through the cut-out portion 78 of the bowl bottom 22. By using hydraulic jacks to operate the various elements of the scraper assemblage, the structure is materially simplified and quick action results. The use of these hydraulic jacks is not, however, essential as cable mechanisms might in some cases be employed, and the improved unit has proven highly satisfactory in actual commercial use and can be most conveniently manipulated by a single attendant.

It should be understood that it is not desired to limit this invention to the exact details of construction, or to the precise mode of use, for various modifications within the scope of the claims may occur to persons skilled in the art.

I claim:

1. A self-powered scraper unit comprising, transporting means having a transverse axis, a main frame suspended intermediate its ends to tilt about said axis, a propelling motor for said means carried by said frame rearwardly of said axis, a scraper bowl rigidly associated with said frame forwardly of said axis, an auxiliary frame transportably supported forwardly of said bowl and being articulably connected to said main frame near said axis, and means for relatively swinging said frames to raise and lower said bowl.

2. A self-powered scraper unit comprising, transporting means having a transverse axis, a main frame suspended intermediate its ends to tilt about said axis, a propelling motor for said means carried by said frame rearwardly of said axis, a scraper bowl rigidly associated with said frame forwardly of said axis, an auxiliary frame transportably supported forwardly of said bowl and being articulably connected to said main frame near said axis, means for relatively swinging said frames to raise and lower said bowl, and means for effecting steering of the assemblage through said auxiliary frame.

3. A self-powered scraper unit comprising, a pair of driving wheels having a transverse axis, a main frame suspended intermediate its ends to tilt about said axis, a propelling motor for said wheels suspended from said frame rearwardly of said axis, a scraper bowl rigidly suspended from said frame forwardly of said axis, an auxiliary frame articulably adjustably associated with said main frame forwardly of said axis, means for holding said frames in various positions of adjustment, and steering wheels for the assemblage supporting said auxiliary frame.

4. A self-powered scraper unit comprising, a pair of driving wheels having a transverse axis, a main frame suspended intermediate its ends to tilt about said axis, a propelling motor for said wheels suspended from said frame rearwardly of said axis, a scraper bowl rigidly suspended from said frame forwardly of said axis, an auxiliary frame articulably associated with said main frame forwardly of said axis, steering wheels for the assemblage supporting said auxiliary frame, and means for relatively swinging said frames to raise and lower said bowl.

5. A self-powered scraper unit comprising, transporting and driving elements having a transverse axis, a main frame tiltably supported on said elements, a propelling motor for said elements suspended from said frame rearwardly of said axis, a scraper bowl having spaced side walls formed rigid with said frame and a blade carrying bottom formed rigid with said walls, an auxiliary frame disposed in front of said bowl and having rearwardly extending arms pivotally attached to the main frame and bowl assembly to permit relative adjustment of the frames, means for holding the frames in various positions of adjustment, and steering elements supporting said auxiliary frame.

6. A self-powered scraper unit comprising, transporting and driving elements having a transverse axis, a main frame tiltably supported on said elements, a propelling motor for said elements suspended from said frame rearwardly of said axis, a scraper bowl having spaced side walls formed rigid with said frame and a blade carrying bottom formed rigid with said walls, an auxiliary frame disposed in front of said bowl and having rearwardly extending arms pivotally attached to the main frame and bowl assembly, steering elements supporting said auxiliary frame, and means coacting with said auxiliary frame and with the front ends of said side walls for raising and lowering said bowl and blade.

7. In combination, driving wheels having a transverse axis, a main frame tiltably supported by said wheels, a propelling engine suspended from said frame rearwardly of said axis, a bowl rigidly associated with said frame forwardly of said axis and having spaced side walls rigidly interconnected by a blade carrying bottom, an auxiliary frame located forwardly of said bowl and being articulably adjustably connected thereto near said axis, means for holding said bowl and auxiliary frame in various positions of adjustment, and steering wheels transportably supporting said auxiliary frame.

8. In combination, driving wheels having a transverse axis, a main frame tiltably supported by said wheels, a propelling engine suspended from said frame rearwardly of said axis, a bowl rigidly associated with said frame forwardly of said axis and having spaced side walls rigidly interconnected by a blade carrying bottom, an auxiliary frame located forwardly of said bowl and being articulably connected thereto near said axis, steering wheels transportably supporting said auxiliary frame, and lifting means interposed between said auxiliary frame and said bowl for elevating the latter.

9. In combination, driving wheels having a transverse axis, a main frame tiltably supported by said wheels, a propelling engine suspended from said frame rearwardly of said axis, a bowl rigidly associated with said frame forwardly of said axis and having spaced side walls rigidly interconnected by a blade carrying bottom, an end gate movable between said walls forwardly toward said blade, means between said engine and said gate for resiliently limiting the rearward movement of the latter, and steering and supporting means associated with the front end of said bowl.

10. In combination, driving wheels having a transverse axis, a main frame tiltably supported by said wheels, a propelling engine suspended from said frame rearwardly of said axis, a bowl rigidly associated with said frame forwardly of said axis and having spaced side walls rigidly interconnected by a blade carrying bottom, an end gate movable within said bowl and over said bottom, a front apron swingably suspended between said side walls and being cooperable with said blade, and steering and supporting means associated with said bowl and being located forwardly thereof.

11. In combination, driving wheels rotatable about a common axis, a rear frame supported by said wheels and being tiltable about said axis, a propelling motor carried by said frame between said wheels and extending rearwardly of said axis, a load carrying bowl rigidly associated with said frame and having side walls projecting forwardly of said axis and rigidly connected by a bottom, an end gate movable within said bowl, moving means for said gate located beneath said motor, and steering wheels transportably supporting the front end of said bowl.

12. In combination, driving wheels rotatable about a common axis, a rear frame supported by said wheels and being tiltable about said axis, a propelling motor carried by said frame between said wheels and extending rearwardly of said axis, a load carrying bowl rigidly associated with said frame and having side walls projecting forwardly of said axis and rigidly connected by a bottom, an end gate movable within said bowl, moving means for said gate located beneath said motor, steering wheels transportably supporting the front end of said bowl, and elevating means interposed between said steering wheels and said bowl for raising the latter.

13. In combination, driving wheels rotatable about a common axis, a rear frame supported by said wheels and being tiltable about said axis, a propelling motor carried by said frame between said wheels and extending rearwardly of said axis, a load carrying bowl rigidly associated with said frame and having side walls projecting forwardly of said axis and rigidly connected by a bottom, an end gate movable within said bowl, a hydraulic jack for moving said end gate located beneath said motor, a front frame transportably supporting the front of said bowl and being articulably connected thereto, and elevating means for said bowl coacting with said front frame.

14. In combination, a two wheel supported rear frame, a driving motor for said wheels suspended from said frame and extending rearwardly of the common wheel axis, a bowl rigidly associated directly with said frame forwardly of said axis and having an integral blade supporting bottom, an end gate movable along said bottom, a resilient bumper interposed between said motor and said end gate, and a hydraulic jack for moving said end gate disposed beneath said motor.

15. In combination, a two wheel supported rear frame, a driving motor for said wheels suspended from said frame and extending rearwardly of the common wheel axis, a bowl rigidly associated directly with said frame forwardly of said axis and having an integral blade supporting bottom, an end gate movable along said bottom, a resilient bumper interposed between said motor and said end gate, a hydraulic jack for moving said end gate disposed beneath said motor, and a front steering and bowl elevating frame articulably connected to said bowl.

16. In combination, a pair of coaxial drive wheels, a propelling motor for said wheels having transmission mechanism extending across the common wheel axis, a bowl rigidly associated with said motor and being tiltable therewith about said axis and having spaced side walls and an integral bottom, a front steering frame articulably connected to said side walls, and means for relatively adjustably articulating said frames and for holding the same in various positions of adjustment.

17. In combination, a pair of coaxial drive wheels, a propelling motor for said wheels having transmission mechanism extending across the common wheel axis, a bowl rigidly associated with said motor and being tiltable therewith about said axis and having spaced side walls and an integral bottom, a front frame disposed forwardly of said bowl and having rearwardly extending arms articulably adjustably connected to said walls near said axis, means for holding said frames in various positions of adjustment, and steering wheels transportably supporting said frame.

18. In combination, a pair of coaxial drive wheels, a propelling motor for said wheels having transmission mechanism extending across the common wheel axis, a bowl rigidly associated with said motor and being tiltable therewith about said axis and having spaced side walls and an integral bottom, a front frame disposed forwardly of said bowl and having rearwardly extending arms articulably adjustably connected to said walls near said axis, steering wheels transportably supporting said frame, and a hydraulic jack carried by said frame and cooperating with said bowl to elevate the latter.

19. In combination, rear drive wheels, a motor having transmission mechanism for propelling said wheels, a bowl rigidly associated with said motor and having an integral bottom, said bowl being tiltable with said motor about the axis of said wheels and said motor and bowl being disposed on opposite sides of said axis, an end gate movable along said bottom by a hydraulic jack located beneath said motor, a front apron swingable toward and away from said bottom by a hydraulic jack carried by said bowl, a front frame transportably supporting the front portion of said bowl, and a hydraulic jack for elevating said bowl carried by said frame.

HENRY C. FRENCH.